(12) United States Patent
Hanada

(10) Patent No.: US 7,549,437 B2
(45) Date of Patent: Jun. 23, 2009

(54) VALVE AND FLUID SYSTEM HAVING THAT VALVE

(75) Inventor: Toshihiro Hanada, Nobeoka (JP)

(73) Assignee: Asahi Organic Chemicals Industry Co., Ltd., Nobeoka-shi, Miyazaki (JP)

( * ) Notice: Subject to any disclaimer, the term of this patent is extended or adjusted under 35 U.S.C. 154(b) by 159 days.

(21) Appl. No.: 10/588,123

(22) PCT Filed: Feb. 4, 2005

(86) PCT No.: PCT/JP2005/002094

§ 371 (c)(1),
(2), (4) Date: Aug. 1, 2006

(87) PCT Pub. No.: WO2005/075865

PCT Pub. Date: Aug. 18, 2005

(65) Prior Publication Data

US 2007/0215214 A1     Sep. 20, 2007

(30) Foreign Application Priority Data

Feb. 6, 2004     (JP) .............................. 2004-030666

(51) Int. Cl.
*F16K 11/22*     (2006.01)
(52) U.S. Cl. .............................. 137/315.11; 137/454.6; 137/606; 251/63.5
(58) Field of Classification Search .............. 137/454.2, 137/454.6, 315.11, 607, 884; 251/62, 63, 251/63.5
See application file for complete search history.

(56) References Cited

U.S. PATENT DOCUMENTS

| | | | | |
|---|---|---|---|---|
| 712,929 A | * | 11/1902 | Hedstrom | 137/454.2 |
| 770,866 A | * | 9/1904 | Mullin | 417/21 |
| 2,727,530 A | * | 12/1955 | Grove et al. | 137/505.28 |
| 3,451,423 A | * | 6/1969 | Priese | 137/556 |
| 4,039,003 A | * | 8/1977 | Cheek | 137/516.29 |
| 4,421,297 A | | 12/1983 | Pongrass et al. | |
| 4,585,207 A | * | 4/1986 | Shelton | 251/62 |
| 4,917,143 A | * | 4/1990 | Grooms | 137/343 |

FOREIGN PATENT DOCUMENTS

| | | |
|---|---|---|
| JP | 5-64585 U | 8/1993 |
| JP | 8-159307 A | 6/1996 |
| JP | 2504050 Y2 | 7/1996 |

(Continued)

*Primary Examiner*—Stephen M Hepperle
(74) *Attorney, Agent, or Firm*—Buchanan Ingersoll & Rooney PC

(57) ABSTRACT

A valve includes a drive part provided with a piston for driving a valve element in an axial direction, a valve body formed at one end in the axial direction with a valve chamber for accommodating the valve element, and a base seat. The drive part includes leg parts suspended down from one end in the axial direction. The leg parts form a receiving part for accommodating the valve body inside the leg parts. The valve body is inserted into the receiving part so that the valve element of the drive part is accommodated in the valve chamber of the valve body. Then, the base seat is fixed to the leg parts in the state with the seat made to abut against the other end of the valve body in the axial direction so that the valve body is held between the base seat and the drive part.

8 Claims, 12 Drawing Sheets

FOREIGN PATENT DOCUMENTS

| | | |
|---|---|---|
| JP | 11-51239 A | 2/1999 |
| JP | 11-193875 A | 7/1999 |
| JP | 11-304030 A | 11/1999 |
| JP | 2001-323854 A | 11/2001 |
| JP | 2003-343753 A | 12/2003 |

* cited by examiner

VALVE AND FLUID SYSTEM HAVING THAT VALVE

TECHNICAL FIELD

The present invention relates to a valve not using metal bolts etc. for connecting the valve body and the drive part so as to enable use even in a highly corrosive fluid or corrosive gas atmosphere and to a fluid system having that valve. More particularly, the present invention relates to a compact, easy-to-assemble valve and a fluid system having that valve.

BACKGROUND ART

In the past, a valve used in a line for transporting various types of chemicals, pure water, electrolytes, or other fluids, as shown in FIG. 15, has been structured to include a valve body 67 and a drive part 68 connected by metal bolts 69 (for example, see Japanese Unexamined Patent Publication No. 8-159307 and Japanese Unexamined Patent Publication No. 11-304030).

In a conventional valve, there has been the problem that corrosive fluid leaking from or passing through the clearances between the valve body 67 and the drive part 68 or the corrosive gas included in the atmosphere in which the valve is placed has corroded the metal bolts 69 and, in the worst case, has led to the breakage of the metal bolts 69 and the destruction of the valve. As means to solve this problem, the method of giving the metal bolts 69 a corrosion resistant coating or the method of changing the metal bolts 69 to plastic have been attempted. However, with the former method, in particular it is difficult to completely coat the parts engaging with the nuts and the costs greatly increase. Further, with the latter method, as plastic bolts do not have sufficient strength, there was the problem that the range of pressure of the fluid which can be used is limited.

DISCLOSURE OF THE INVENTION

An object of the present invention is to solve the above problems in the prior art and to provide an easy-to-assemble, compact valve not using metal bolts and a fluid system having that valve.

The present invention provides, in a first aspect, a valve which includes a drive part for driving a valve element in an axial direction and a valve body formed with a valve chamber accommodating the valve element at one end in the axial direction, wherein the valve further includes a base seat, and the drive part includes leg parts suspended down from the drive part in the axial direction, the leg parts forming a receiving part inside the leg parts for accommodating the valve body, the valve body being inserted into the receiving part so that the valve element of the drive part is accommodated in the valve chamber of the valve body, the base seat being fixed to the leg parts in the state with the base seat made to abut against the other end of the valve body in the axial direction so that the valve body is held between the base seat and the drive part.

Preferably, in the valve, the leg parts are a pair of leg parts suspended down from the drive part in the axial direction facing each other, and the receiving part is formed between the pair of leg parts.

Further, in the valve, the base seat may be fixed to the leg parts by bonding or welding.

Further, in the valve, either projections projecting out in a direction vertical to the axial direction or recesses engaging with the projections may be provided at the leg parts, while the other of the projections and recesses may be provided at the base seat, and the projections and the recesses may be engaged to fix the base seat to the leg parts.

In a preferred embodiment, the base seat has a depression for accommodating one ends of the leg parts in the axial direction, either of the projections or recesses are formed at the outer side faces of the one ends of the leg parts, and the other of the projections and recesses are formed at side walls of the depression.

In another preferred embodiment, the base seat has a projecting part to be inserted into the receiving part, either of the projections and recesses are formed at inner side faces of the leg parts, and the other of the projections and recesses are formed at parts of the circumference of the projecting part facing the inner side faces of the leg parts.

Further, the present invention provides, in a second aspect, a fluid system having any of the above valves. This fluid system includes a fluid feed system or fluid discharge system.

The valve according to the present invention and fluid system having that valve, being structured as above, give the following excellent effects.

Since the valve according to the present invention grips the valve body between the drive part and the base seat so as to hold the valve body, there is no need to use bolts to join the valve body and the drive part and there is no danger of corrosive fluid or gas damaging the fastening parts and destroying the valve. In particular, fixing the base seat and the leg parts to each other by engaging cooperating projections and recesses with each other, bonding, or welding is effective since there is no longer a need for bolts or other fasteners to assemble the valve. Further, the valve according to the present invention is simple in structure, so is compact, easy to assemble, and excellent in maintenance ability. For this reason, for example, a fluid feed system, fluid discharge system or other such fluid system having the valve according to the present invention can be kept small as a system itself and enables the labor involved in the work of maintenance to be reduced.

BRIEF DESCRIPTION OF THE DRAWINGS

The above and other objects, features, and advantages of the present invention will be described below in more detail based on the embodiments of the present invention with reference to the accompanying drawings, wherein.

BEST MODE FOR CARRYING OUT THE INVENTION

Embodiments of the present invention will be described below with reference to the drawings. However, the present invention should not, of course, be limited to these embodiments.

Figure 1:
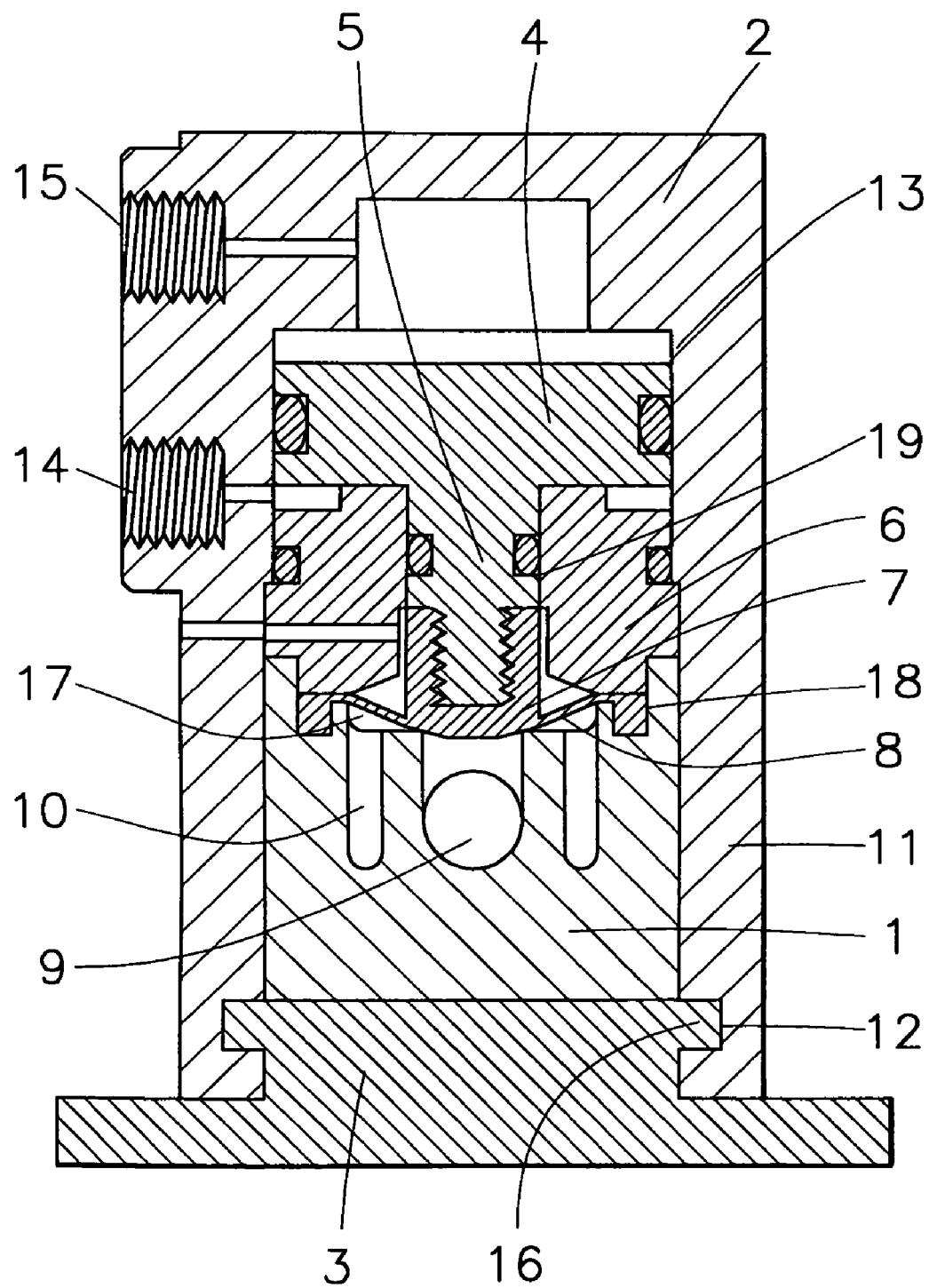
FIG. 1 is a vertical cross-sectional view showing a closed state of a valve according to a first embodiment of the present invention.

Referring to FIG. 1, the valve according to the first embodiment of the present invention includes a valve body 1, a drive part 2, a base seat 3, a piston 4, a diaphragm holder 6, a valve element 7, and a diaphragm 8.

The valve body 1 is provided with a valve chamber 17 positioned at the center at the top end in the axial direction, an inlet channel 9 communicating with the valve chamber 17, and an outlet channel 10. Further, a annular groove 18 is provided at the outside of the valve chamber 17 on the top surface of the valve body 1.

The drive part 2 is provided inside it with a cylindrical cylinder part 13. The drive part 2 is further provided at the bottom thereof with a pair of leg parts 11 so as to extend the side faces of the drive part 2 downward. The leg parts 11 have at the bottom inner walls thereof grooves 12 extending in the channel axial direction and formed into cross-sectional rectangular shapes. The two leg parts 11 between them form a receiving part into which the valve body 1 is inserted. The bottoms of the leg part are designed so that the top surfaces of the grooves 12 are flush with the bottom end surface of the valve body 1. Further, a side face of the drive part 2 is provided with a pair of working fluid supply ports 14 and 15 communicating with the top side and the bottom side of the cylinder part 13.

The base seat 3 includes a base part and a projecting part provided above the base part and to be inserted between the leg parts 11. The projecting part is provided at the two sides of the top thereof with fitting rectangular projections 16 extending in the direction of the channel axis. Further, the base part of the base seat 3 extends further outward in the horizontal direction compared with the projecting part. Its width may be the same as the width of the drive part 2 or longer. The rectangular projections 16 have complementary shapes with the grooves 12 of the drive part 2. By fitting the rectangular projections 16 into the grooves 12 of the drive part 2 or engaging the rectangular projections 16 with the grooves 12, the valve body 1 is gripped and fixed between the drive part 2 and the base seat 3.

The piston 4 is inserted into the cylinder part 13 of the drive part 2 in a sealed state and to be able to move up and down in the axial direction. The piston 4 is provided at the bottom center thereof with a rod part 5 suspended downward.

The diaphragm holder 6 has at the center thereof a through-hole 19 through which the rod part 5 of the piston 4 passes and is held between the valve body 1 and the drive part 2.

The valve element 7 is housed in the valve chamber 17. The valve element 7 is screwed over the tip of the rod part 5 of the piston 4 passing through the through-hole 19 of the diaphragm holder 6 and projecting from the bottom surface of the diaphragm holder 6 and is configured to move up and down in the axial direction along with the upward or downward motion of the piston 4. Further, the valve element 7 has the diaphragm 8 at the outer circumference thereof. The outer peripheral edge of the diaphragm 8 is inserted into the annular groove 18 of the valve body 1 and is held between the diaphragm holder 6 and the valve body 1 so as to prevent internal fluid from leaking to the outside.

Further, in the present invention, the drive part is not particularly limited to an air driven type and may also be a manual type or an electric type. The type of the valve is also not particularly limited to a diaphragm valve and may also be a needle valve, a pinch valve, etc.

Further, in the present invention, the body and other members are preferably ones made of PTFE (polytetrafluoroethylene), PFA (tetrafluoroethylene perfluoroalkyl vinyl ether copolymer), or other fluororesins, but polyvinyl chloride, polypropylene, and other plastics may also be used. The invention is not particularly limited to these materials.

As described above, the valve of the present invention has few parts, is simple in structure, and is compact in configuration.

Next, the method of assembly of the valve of the present embodiment will be explained.

Figure 7:
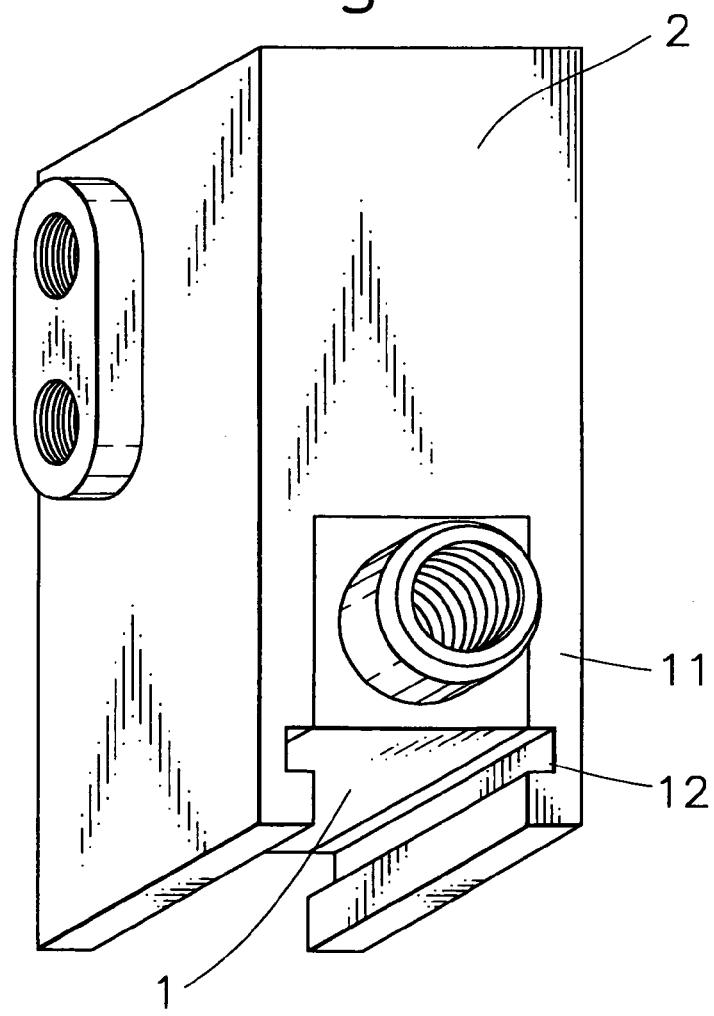
FIG. 7 is a perspective view showing the state of the valve body fit into the drive part shown in FIG. 5.

First, the valve body 1 is inserted between the pair of leg parts 11 of the drive part 2 and the valve element 7 is placed in the valve chamber 17 of the valve body 1 (state of FIG. 7). At this time, the front ends of the leg parts 11 project downward from the bottom surface of the valve body 1, and the top surfaces of the grooves 12 at the inner walls of the leg parts 11 are flush with the bottom surface of the valve body 1. Note that the diaphragm 8 is held via the diaphragm holder 6 between the valve body 1 and the drive part 2.

Figure 4:
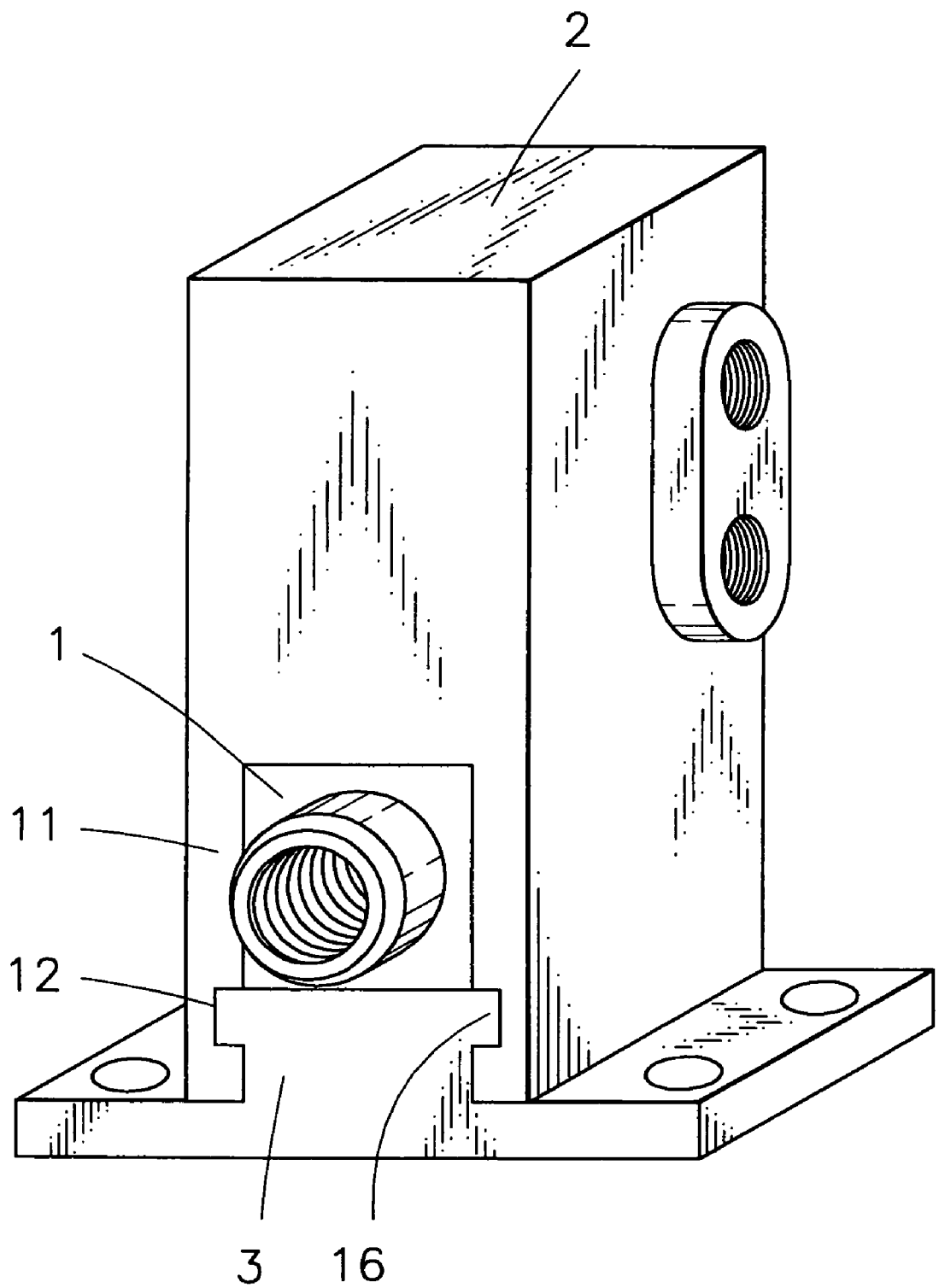
FIG. 4 is a perspective view of the valve shown in FIG. 1.
Figure 5:
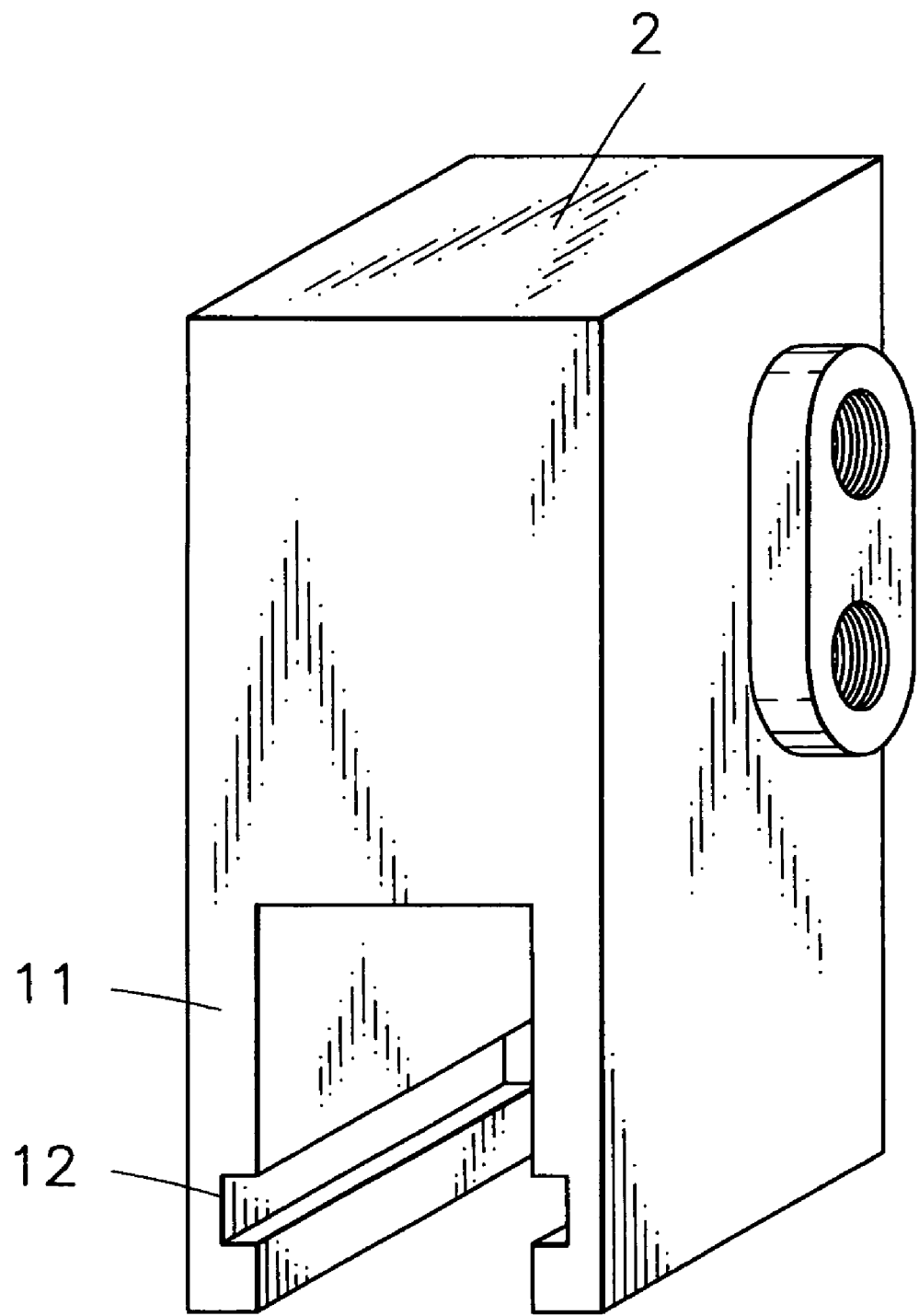
FIG. 5 is a perspective view of a drive part of the valve shown in FIG. 1.
Figure 6:
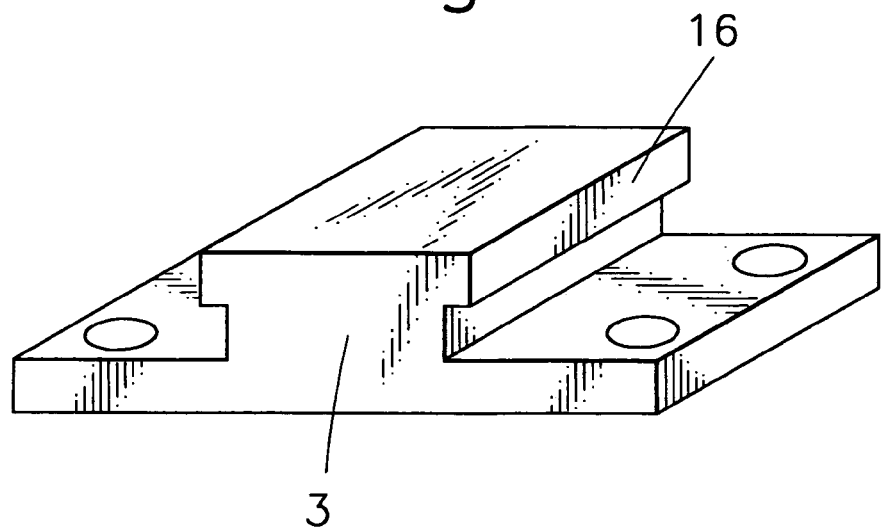
FIG. 6 is a perspective view of a base seat of the valve shown in FIG. 1.
Figure 8:
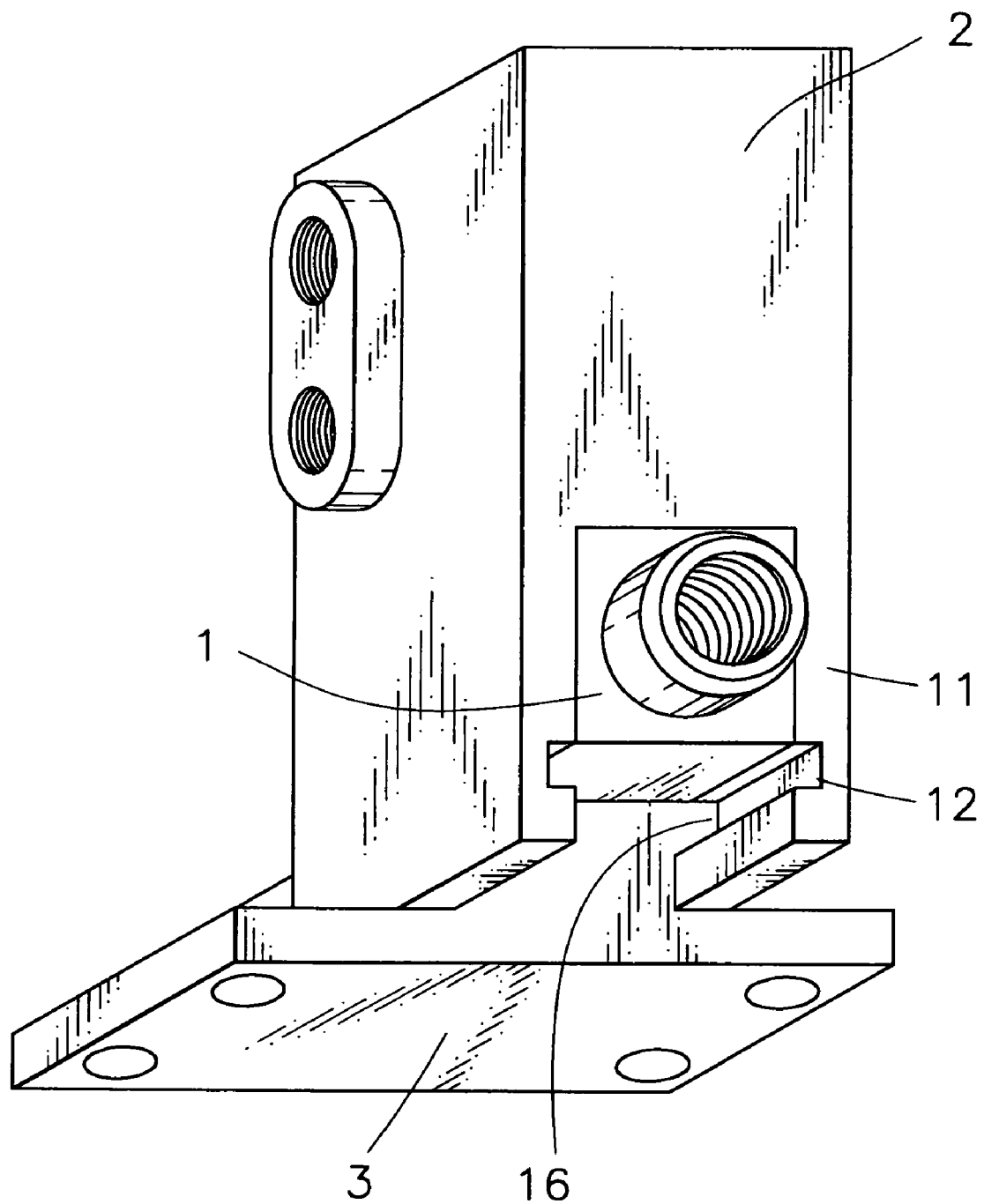
FIG. 8 is a perspective view showing the state of the base seat fit into the assembly of the drive part and the valve body shown in FIG. 7.

Further, the top end of the projecting part of the base seat 3 is made to abut against the bottom end of the valve body 1. In that state, the rectangular projections 16 of the base seat 3 having shapes corresponding to the grooves 12 of the leg parts 11 are fit into the grooves 12 (state of FIG. 8). Due to this, the valve body 1 is gripped and fixed by the drive part 2 and the base seat 3 (state of FIG. 4).

In this way, the valve of the present invention is extremely easy to assemble and does not require any bolts or other fasteners at all. Therefore, the corrosive fluid or the corrosive gas included in the atmosphere in which the valve is placed will not corrode metal bolts leading to the bolts breaking and the valve being destroyed. Further, since the parts of the valve are made of a plastic, the valve can be used in various types of chemical lines in accordance with the properties of the plastic. In particular, when using a fluororesin, the valve can be used without any concern regarding corrosion. Further, the valve may be disassembled by a method of the reverse order from the assembly method. Therefore, the valve can be extremely easily disassembled and the valve of the present invention is superior in maintenance ability.

In addition, the leg parts 11 and the base seat 3 need not be fixed by fitting and may also be fixed by bonding, heat welding, ultrasonic welding, vibration welding, or other welding. Further, the leg parts 11 and the base seat 3 may also be fixed by fitting used together with bonding, or welding.

When employing an assembly method using bonding, a binder is coated on at least one of the end surfaces of the leg parts and the top surface of the extended parts of the base seat (that is, the bonding surface), then the leg parts and the base seat are pressed together in the state with the valve body inserted between the leg parts and the binder is cured. Note that the binder used here is not particularly limited in type. Any one may be used so long as it gives sufficient bond strength for the materials of the leg parts and base seat.

When employing an assembly method using welding, the heat of a heater etc., the heat of friction using vibration or ultrasonic waves, etc. is used to melt the bonding surfaces of the end surfaces of the leg parts and the extended parts of the base seat and these are pressed together to join them.

The valve of the thus configured embodiment operates as follows.

Figure 2:
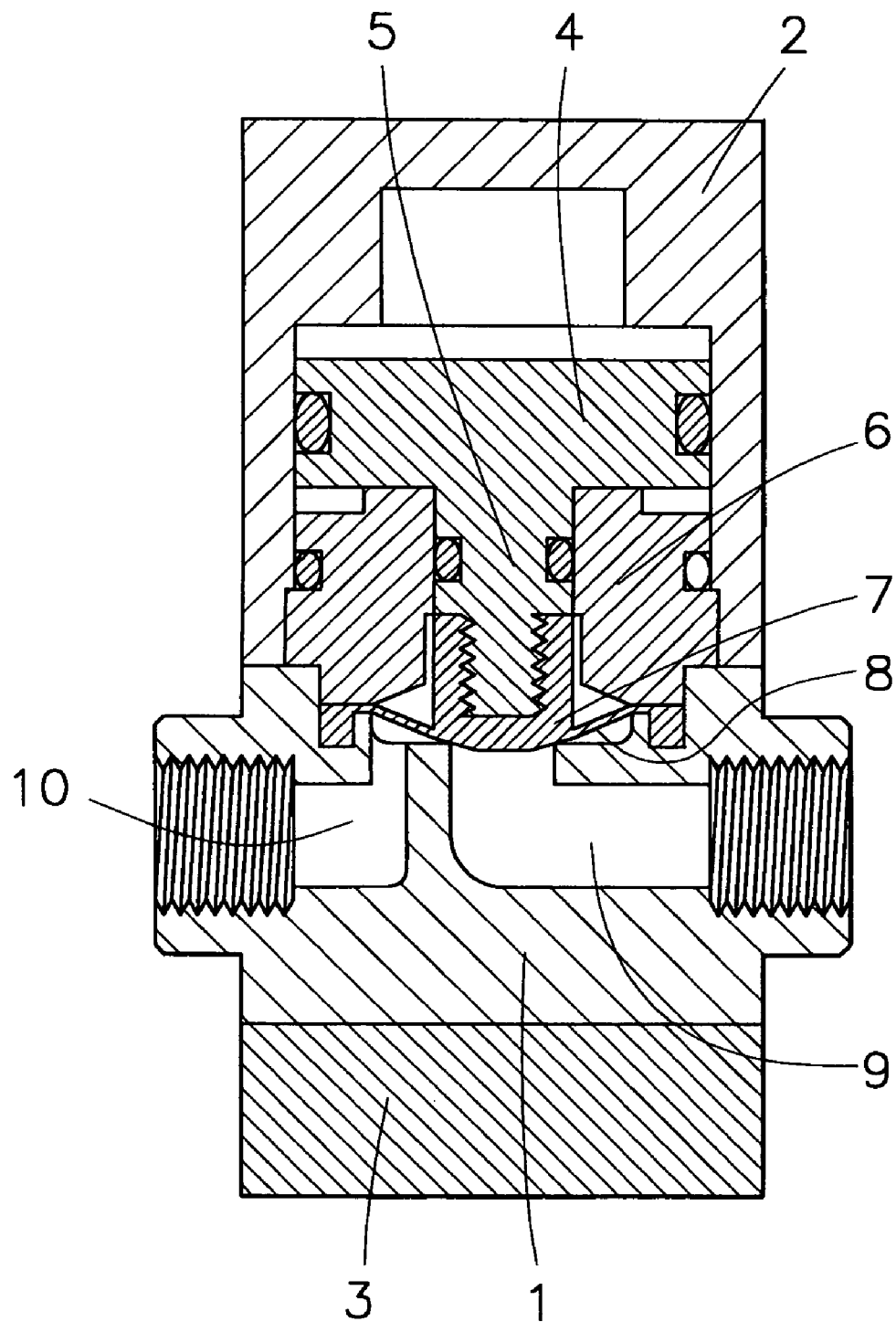
FIG. 2 is a vertical cross-sectional view of the valve shown in FIG. 1 as viewed from a side face (in a direction perpendicular to a channel axis)
Figure 3:
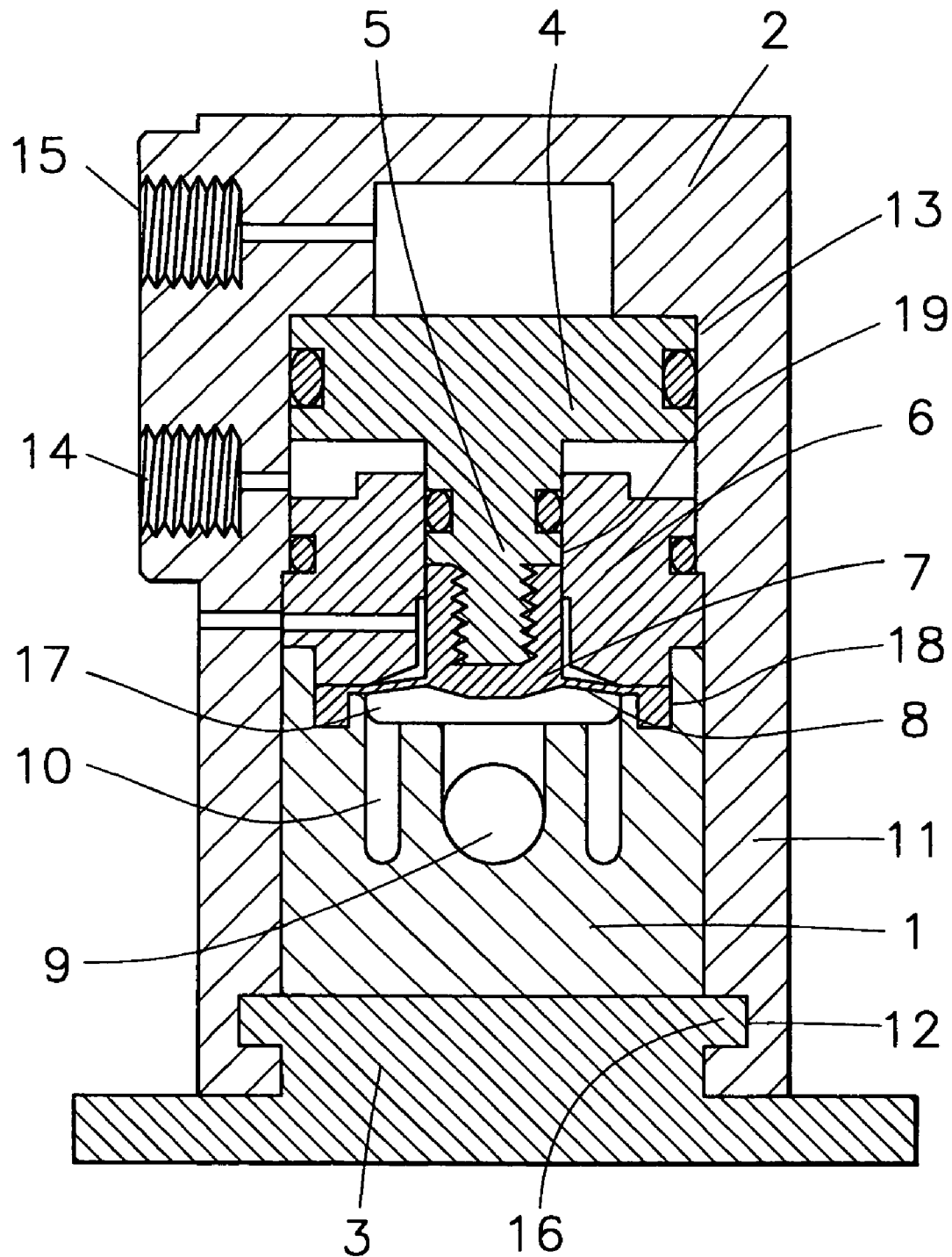
FIG. 3 is a vertical cross-sectional view showing an open state of the valve shown in FIG. 1.

FIGS. 1 and 2 show a closed state of the valve. When the working fluid supply port 14 provided at a side face of the drive part 2 is injected with a working fluid (for example compressed air) from the outside, the pressure of the working fluid pushes the piston 4 up, whereupon the rod part 5 connected with this is pulled upward, the valve element 7 connected with the bottom end of the rod part 5 is also pulled upward, and the valve is opened (state of FIG. 3).

On the other hand, when working fluid is injected from a working fluid supply port 15, the piston 4 is pushed down. Along with this, the rod part 5 and the valve element 7 connected with the bottom end thereof are also pushed downward and the valve is closed (state of FIG. 1 and FIG. 2).

Figure 9:
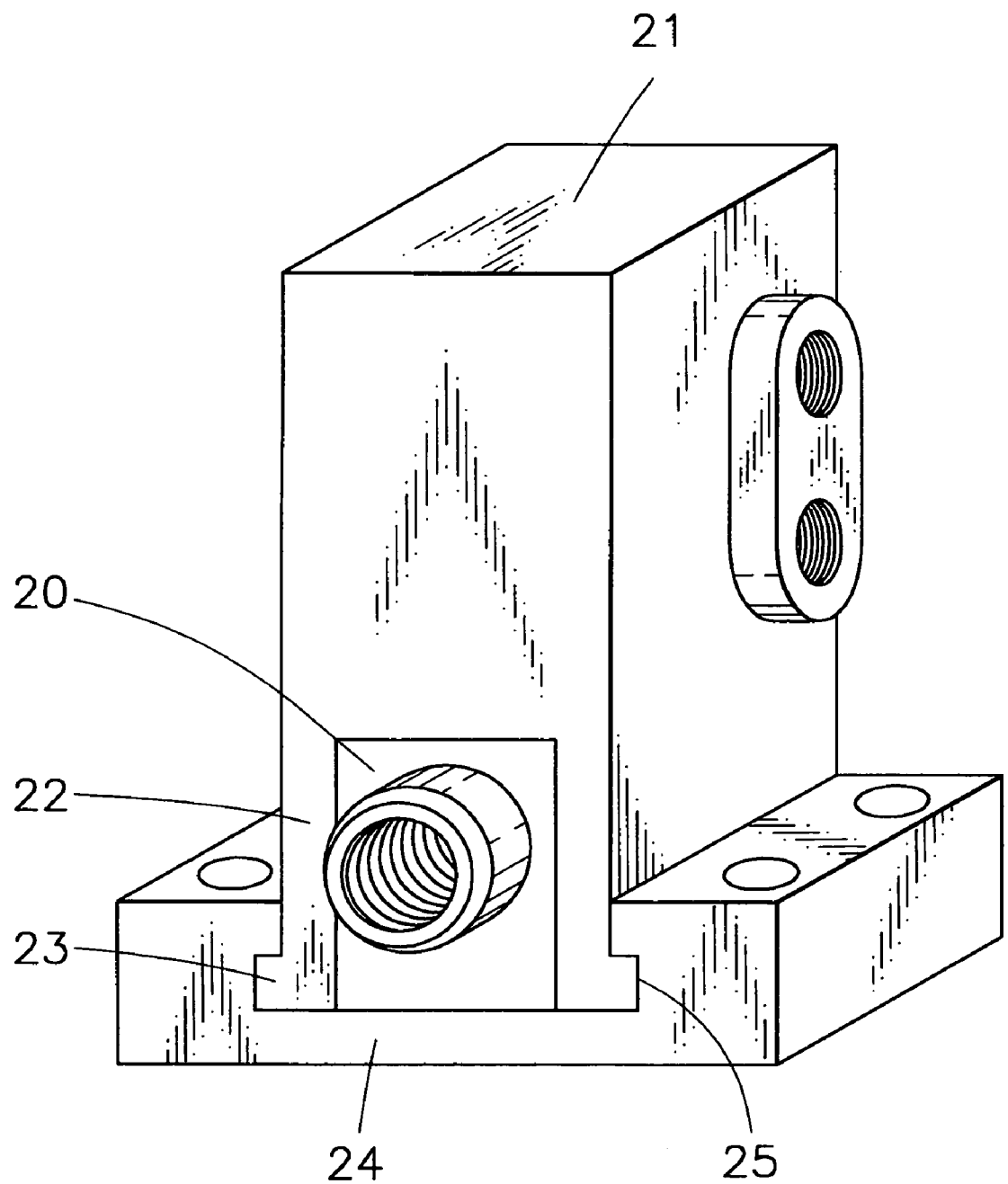
FIG. 9 is a perspective view showing a valve according to a second embodiment of the present invention.

FIG. 9 shows a second embodiment of a valve according to the present invention.

The valve according to the second embodiment includes a valve body 20, a drive part 21, and a base seat 24.

Since the valve body 20 is configured in the same way as the valve body 1 of the valve of the first embodiment, explanations of its parts will be omitted.

The drive part 21 differs from the drive part 2 of the valve of the first embodiment in that the front ends of the leg parts 22 are formed with rectangular projections 23 projecting out to the outer sides.

The base seat 24 has a center part shaped as a groove extending in the direction of the channel axis and depressed downward in a rectangular cross section. The inner walls of the base seat 24 are provided with rectangular cross-sectional shaped recessed groove parts 25 extending in the direction of the channel axis and having shapes corresponding to the rectangular shaped projections 23 of the drive part 21. These recessed groove parts 25 are adapted to fit the rectangular shaped projections 23 inside them.

In the valve of the second embodiment, in the same way as the valve of the first embodiment, the base seat 24 and the leg parts 22 are fit together, whereby the valve body 20 inserted between the leg parts 22 of the drive part 21 is held between the drive part 21 and the base seat 24.

In this way, the valve of the second embodiment, in the same way as the valve of the first embodiment, is simple in structure, compact, and easy to assemble.

Since the operation of the valve of the second embodiment is similar to that of the valve of the first embodiment, the explanation will be omitted.

Figure 10:
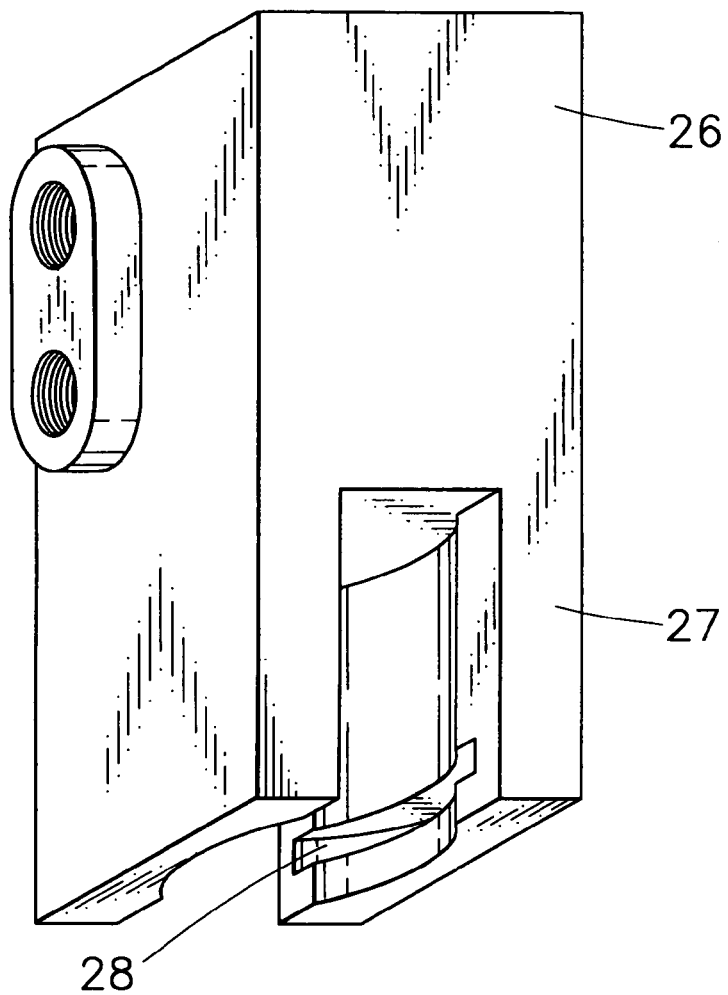
FIG. 10 is a perspective view showing a drive part of a valve according to a third embodiment of the present invention.
Figure 11:
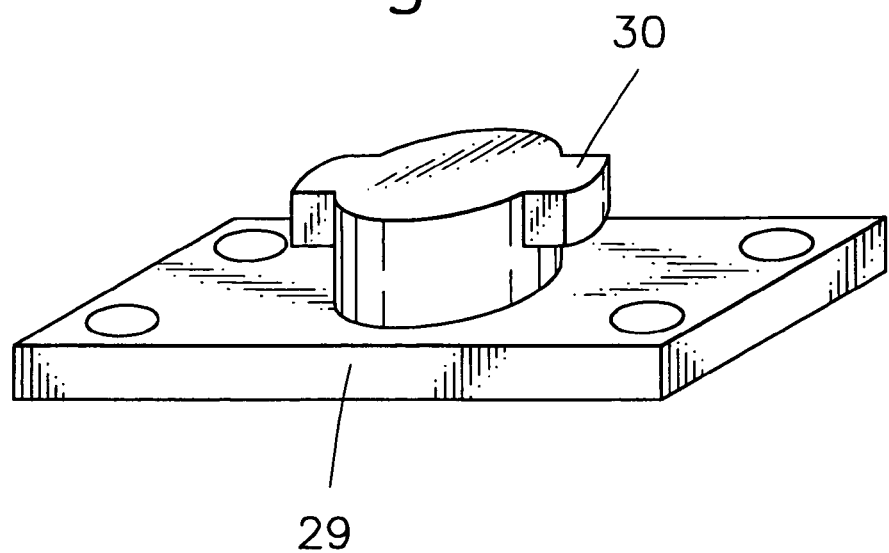
FIG. 11 is a perspective view showing a base seat of the valve according to the third embodiment of the present invention.

FIG. 10 and FIG. 11 show a valve according to a third embodiment of the present invention.

The drive part 26 of the valve of the third embodiment differs from the drive part 2 of the valve of the first embodiment in that grooves 28 of leg parts 27 are formed into circular ring shapes.

Further, a base seat 29 of the valve of the third embodiment has a center part projecting out in a cylindrical shape from the flat plate shaped base part. The cylinder is provided at the outer circumference of the top thereof with a pair of projections 30 projecting out in the radial direction.

As the rest of the structure of the valve of the third embodiment is similar to that of the valve of the first embodiment, it will not be described in detail here.

The leg parts 27 and the base seat 29 are fixed together as follows.

First, the projections 30 are oriented in the same direction as the direction of the channel axis of the valve body. In that state, the leg parts 27 and the base seat 29 are fit together.

Next, the base seat 29 is turned 90 degrees to make the projections 30 fit into the grooves 28 of the leg parts 27, whereby the leg parts 27 and base seat 29 are fixed in place and the valve body inserted between the leg parts 27 of the drive part 26 is held between the drive part 26 and the base seat 29.

In this way, the valve of the third embodiment, in the same way as the valve of the first embodiment, is simple in structure, compact, and easy to assemble.

Since the operation of the valve of the third embodiment is similar to that of the valve of the first embodiment, the explanation will be omitted.

Figure 12:
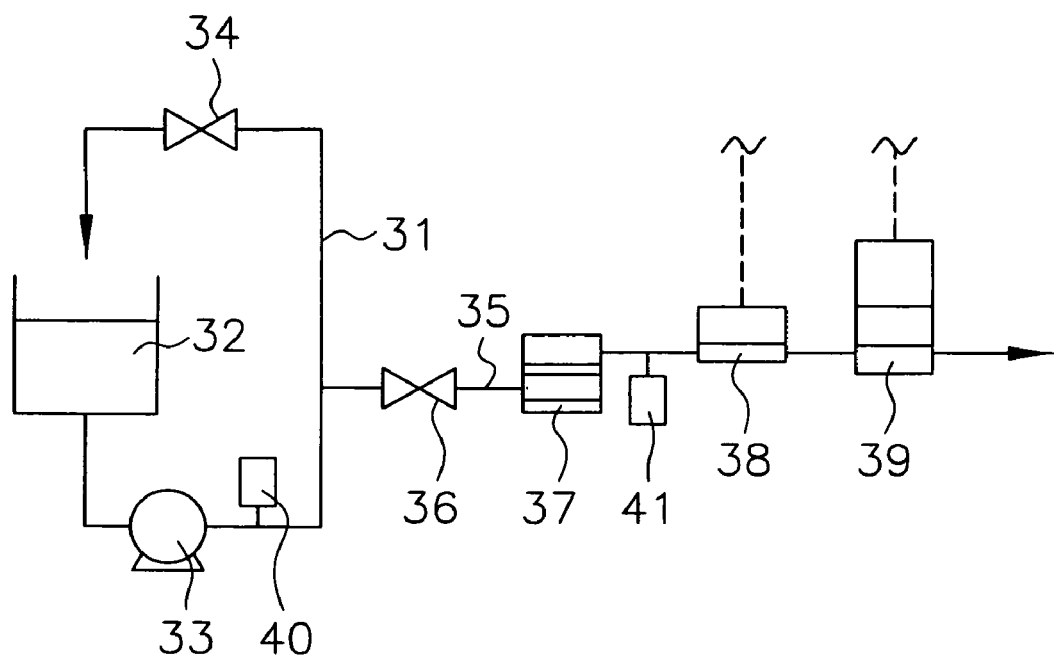
FIG. 12 is a conceptual view of the configuration of a fluid feed system having valves according to the present invention.

FIG. 12 shows a fluid feed system using the valves according to the present invention.

As shown in FIG. 12, a circulation line 31 is laid from a tank 32 through a pump 33 and a valve 34 to a tank 32. Further, a feed line 35 extends branched from the middle of the circulation line 31. From the upstream side, a valve 36, a regulator 37, a flowmeter 38, and an electric pinch valve 39 are arranged in series in that order. A pressure gauge 40 may be provided at the downstream side of the pump 33 of the circulation line 31, while a pressure sensor 41 may be provided at the downstream side of the regulator 37 of the feed line 35. Further, a chemical is used as the fluid flowing through the lines. The members arranged along the lines will be explained below in detail.

The tank 32 stores a chemical to be fed to a point of use. In this embodiment, as the fluid, a chemical (hydrochloric acid, sulfuric acid, nitric acid, fluoric acid, sodium hydroxide, ammonia water, etc.) is used, but pure water, a resist, CMP slurry, etc. may also be used. The fluid is not particularly limited so long as it is suitably used at the point of use.

The pump 33 is a bellows pump for pumping fluid to the lines. In this embodiment, a bellows pump is used, but the invention is not particularly limited to this. Any pump may be used regardless of the occurrence of pulsation.

The valves 34 and 36 are valves of the present invention such as valves of the first embodiment. Since the operations thereof are similar to that of the valve of the first embodiment, their explanations will be omitted.

The regulator 37 functions to suppress pulsation of the fluid and control the pressure to be substantially constant.

The flowmeter 38 is an ultrasonic wave flowmeter utilizing the time difference of propagation of ultrasonic waves so as to measure the flow rate of a fluid. Although this embodiment uses an ultrasonic wave flowmeter, a Karman vortex flowmeter, propeller flowmeter, electromagnetic flowmeter, differential pressure flowmeter, volume flowmeter, hot wire flowmeter, mass flowmeter or other flowmeter may also be used.

The electric pinch valve 39 is an electrically driven automatic pinch valve which is electrically driven to change the opening degree and control the flow rate. In this embodiment, an electrically driven type is used, but the invention is not particularly limited to this. An air driven pinch valve etc. may also be used if it uses a drive system enabling an automatic opening/closing operation.

The thus configured fluid feed system operates as follows.

When valve 36 is opened, the chemical pumped from the pump 33 also flows to the feed line 35 branched from the circulation line 31. The chemical is controlled to a certain pressure by the regulator 37, and its pressure is then measured by the flowmeter 38. The measurement value is converted to an electrical signal, and the opening degree of the electric pinch valve 39 is feedback-controlled by a control part (not shown). That is, feedback control changes the opening degree of the electric pinch valve 39 and controls it so as to make the flow rate of the fluid converge to the value of the set flow rate. For this reason, the chemical passing through the feed line 35 is stably fed to the point of use at the freely set flow rate.

The valves according to the present invention are compact. The configuration for control of the flow rate is also compact. Therefore, the system itself can be kept small. Further, as the valves according to the present invention are easy to maintain, the labor involved in the work of maintaining the system can be reduced.

Figure 13:
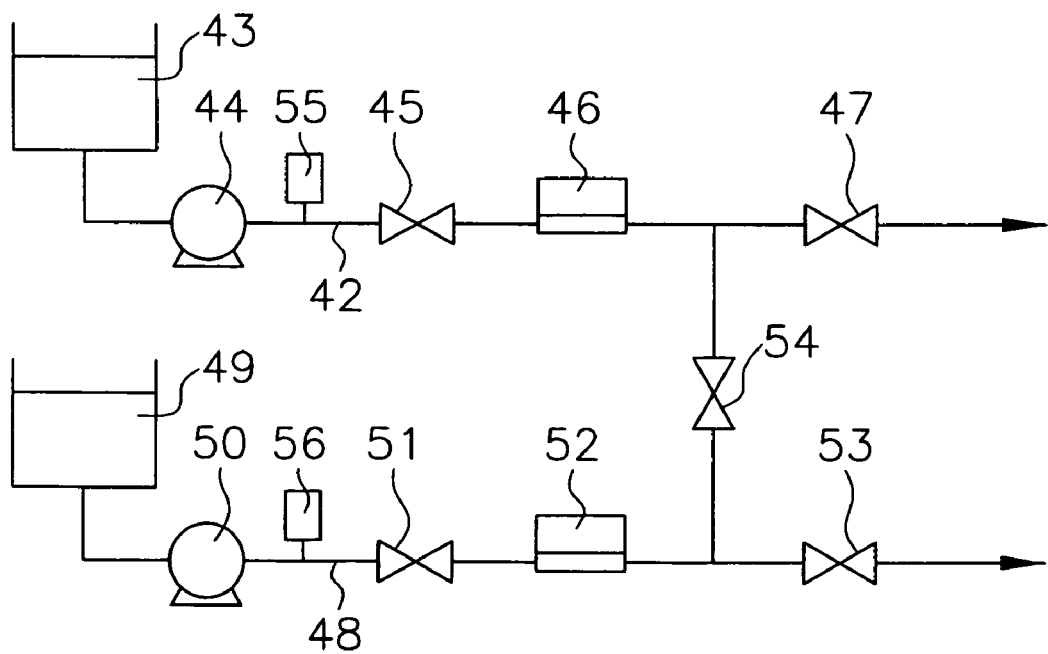
FIG. 13 is a conceptual view of the configuration of another fluid feed system having valves according to the present invention.

FIG. 13 shows another fluid feed system using the valves according to the present invention.

The fluid feed system shown in FIG. 13 includes a first feed line 42, a second feed line 48, and a valve 54. Along the first feed line 42, from the upstream side, a tank 43, a pump 44, a valve 45, a flowmeter 46, and a valve 47 are arranged in series in that order. On the other hand, along the second feed line 48, from the upstream side, a tank 49, a pump 50, a valve 51, a flowmeter 52, and a valve 53 are arranged in series in that order. Further, a valve 54 is arranged on a line communicating the first feed line 42 with the second feed line 48. Further, a pressure gauge 55 may provided at the downstream side of the pump 44 of the first feed line 42, while a pressure gauge 56 may be provided at the downstream side of the pump 50 of the second feed line 48. As the fluid flowing through the lines, a chemical is used.

Since the members laid along the lines, that is, the tanks 43 and 49, the pumps 44 and 50, the valves 45, 47, 51, 53, and 54, and the flowmeters 46 and 52 are similar to those in the embodiment shown in FIG. 12, their explanations will be omitted.

The fluid feed system of the thus configured embodiment operates as follows.

When the valve 54 is closed and the valves 45, 47, 51, and 53 are opened, the chemical stored in the tank 43 is pumped by the pump 44 through the first feed line 42 and fed to the point of use. In the same way, the chemical stored in the tank 49 is pumped by the pump 50 through the second feed line 48 and fed to the point of use.

When the valve 54 is opened, the valves 45, 47, 51, and 53 may be operated to open and close for various manners of use in accordance with the application. For example, by opening the valves 45 and 53 and closing the valves 47 and 51, it is possible to change the fed point of use of the chemical. Further, for example by opening the valves 45, 51, and 53 and closing the valve 47, it is possible to mix the chemicals of the tanks 43 and 49 for feed to the point of use.

The chemicals stored in the tanks 43 and 49 may be the same or different. The flow rates of the first feed line 42 and the second feed line 48 may also be the same or different.

The system of this embodiment uses many valves according to the present invention. However, since the valves according to the present invention are compact, they do not take up space in the layout of the system and the system itself can be kept small. Further, since the valves according to the present invention are easy to maintain, the labor involved in the work of maintaining the system can be reduced.

Note that the fluid feed systems using the valves according to the present invention are not limited to the embodiment shown in FIG. 12 or the embodiment shown in FIG. 13. The system configuration may be of any type so long as using the valves according to the present invention.

Figure 14:
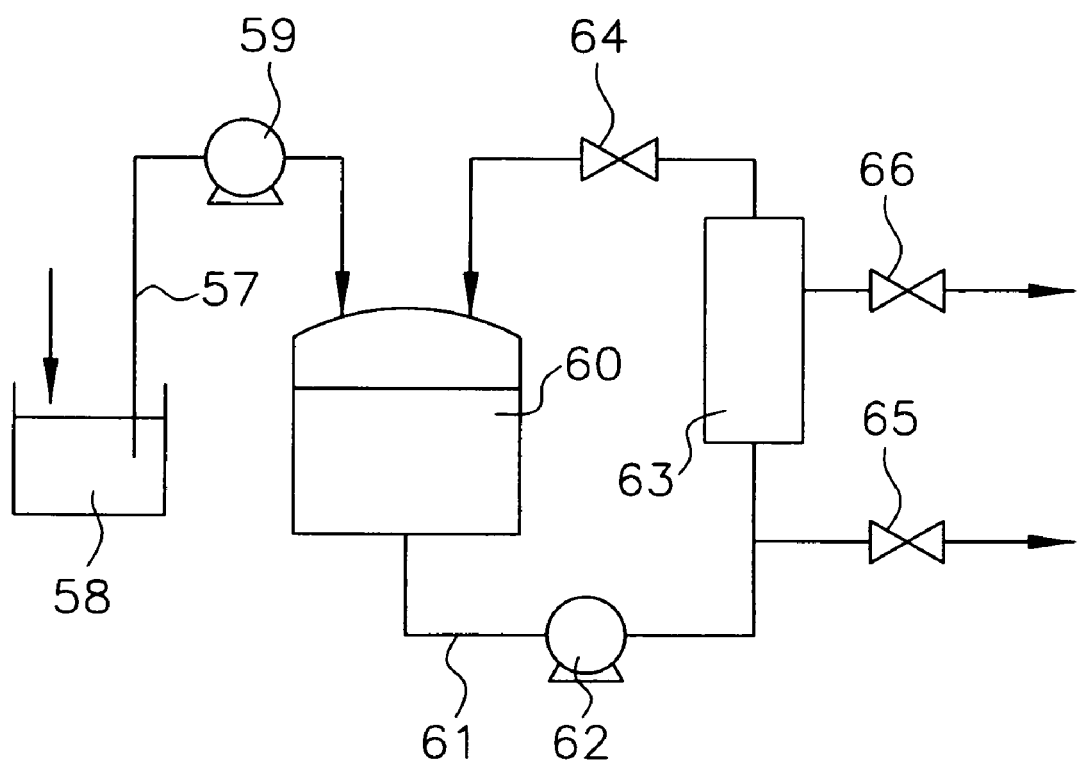
FIG. 14 is a conceptual view of the configuration of a fluid discharge system having valves according to the present invention.
Figure 15:
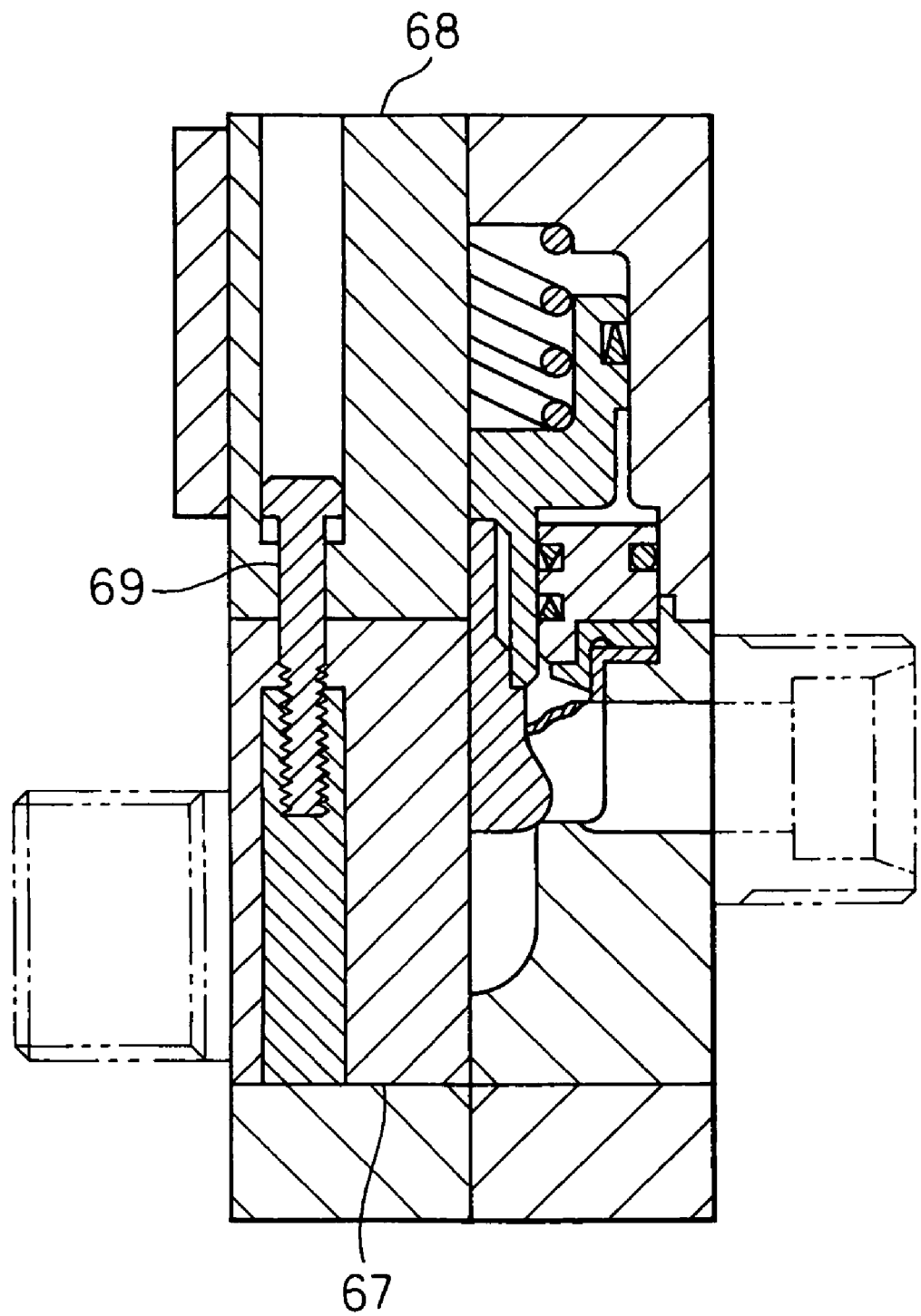
FIG. 15 is a vertical cross-sectional view showing a conventional valve.

FIG. 14 shows a fluid discharge system using the valves according to the present invention.

As shown in FIG. 14, a discharge line 57 extends from a tank 58 through a pump 59 to a concentration tank 60. Further, a circulation line 61 is laid to circulate from the concentration tank 60 through a pump 62, a filter apparatus 63, and a valve 64 to the concentration tank 60. Further, a valve 65 is arranged on the line branched from between the pump 62 and filter apparatus 63 for discharge of concentrate liquor. A valve 66 is arranged on the line for discharging filtrate passed by the filter apparatus 63. As the fluid flowing through the lines, a CMP slurry is used.

The members arranged along the lines will be explained below in detail.

The tank 58 stores the waste liquor of the CMP slurry discharged from the point of use. In this embodiment, CMP slurry is used as the fluid, but a chemical (hydrochloric acid, sulfuric acid, nitric acid, fluoric acid, sodium hydroxide, ammonia water, etc.), pure water, a resist, etc. may also be used. The fluid is not particularly limited so long as it is able to be suitably used at the point of use.

The concentration tank 60 stores the waste liquor of the CMP slurry from the discharge line 57 and further stores the concentrated liquor of the CMP slurry not passed by the filter apparatus 63 in the circulation line 61.

The filter apparatus 63 functions to filter the waste liquor of the CMP slurry and divide it into a filtrate and concentrated liquor of CMP slurry not passed. In this embodiment, a single filter apparatus is provided, but the fluid may also be run through a plurality of filter apparatuses.

Since the pumps 59 and 62 and the valves 64, 65, and 66 are similar to the pumps and valves of the fluid feed system shown in FIG. 12, explanations will be omitted.

This configured fluid discharge system operates as follows.

The waste liquid of the CMP slurry discharged from the point of use is stored once in the tank 58. First, the pump 59 pumps it from the tank 58 to the concentration tank 60. Next, the pump 62 circulates the CMP slurry through the circulation line 61. At this time, the filtrate passed by the filter apparatus 63 is discharged through the opened valve 66. The discharged filtrate is recycled for use or is treated and is discharged. Further, the concentrated liquor of the CMP slurry not passed is circulated through the circulation line 61 and stored in the concentration tank 60 in a concentrated state. The concentrated liquor stored in the concentration tank 60 is discharged by opening the valve 65. The discharged concentrated liquor is disposed of as industrial waste.

In this way, in the system using the valve according to the present invention, since the valve used is compact, it does not take up space in the system layout. In particular, in a fluid discharge system, complicated piping is often laid out and valves are provided all over the piping. However, if the valves according to the present invention are used, they do not take up space in the system and therefore the system itself can be kept small. Further, since the valve according to the present invention is easy to maintain, in a fluid discharge system using a large number of the valves according to the present invention, the greater the ratio of the valves according to the present invention in the placed valves, the more the labor involved in the work of maintenance can be reduced.

Note that the fluid discharge system using the valve according to the present invention is not limited to the fluid discharge system shown in FIG. 14. The system may be configured as any type so long as it has the valve according to the present invention.

The valve according to the present invention can be used in fluid feed systems or fluid discharge systems used in production lines of chemical plants, the food industry, the pharmaceutical industry, etc., semiconductor production systems, liquid crystal and other FPD production systems, and various types of systems involving plating or the supply of chemicals etc. where if metal bolts were used, the corrosive fluid or gas would cause corrosion which in turn would be liable to damage the fastened parts. Further, since it is compact, it can be used in places with little space for piping. The system using the valve according to the present invention can be kept small as a system itself and enables the work of maintenance to be reduced.

Although the present invention has been described with reference to the embodiments shown in the accompanying drawings, these embodiments are only illustrative but not limitative. Therefore, the scope of the present invention should be defined by the appended claims and the embodiments of the present invention can be modified or changed without departing from the scope of the claims.

The invention claimed is:

1. A valve comprising a drive part for driving a valve element in an axial direction and a valve body formed with a valve chamber accommodating said valve element at one end in said axial direction, wherein said valve further comprises a base seat, and said drive part comprises said faces and a pair of leg parts suspended down from said drive part in said axial direction, said pair of leg parts facing each other and having side faces a continuous extension of the side faces of the drive part, said leg parts and said drive part forming a single unitary piece, and said pair of leg parts forming a receiving part between said pair leg parts for accommodating said valve body, said valve body being inserted into said receiving part so that said valve element is accommodated in said valve chamber of said valve body, said base seat being fixed to said pair of leg parts in a state in which said base seat abuts against another end of said valve body in said axial direction so that said valve body is held between said base seat and said drive part.

2. The valve according to claim 1, wherein said base seat is fixed to said pair of leg parts by bonding or welding.

3. The valve according to claim 1, wherein either projections projecting out in a direction perpendicular to said axial direction or recesses engaging with said projections are provided at said pair of leg parts, while the other of said projections and said recesses are provided at said base seat, and said projections and said recesses are engaged to fix said base seat to said pair of leg parts.

4. The valve according to claim 3, wherein said base seat has a depression at the center thereof, said depression being shaped as a groove extending in a direction perpendicular to said axial direction and being depressed downward as viewed in a rectangular cross section, said projections are formed at the outer side faces of one ends of said pair of leg parts, and the recesses are formed at inner walls of said depression.

5. The valve according to claim 3, wherein said base seat has a projecting part to be inserted into said receiving part, said recesses are formed at inner side faces of said pair of leg parts, and said projections are formed at parts of the circumference of said projecting part facing the inner side faces of said pair of leg parts.

6. A fluid system having the valve according to claim 1.

7. The fluid system according to claim 6, wherein said fluid system is a fluid feed system or a fluid discharge system.

8. The valve according to claim 1, wherein said drive part and said pair of leg parts are comprised of the same material.

* * * * *